(12) United States Patent
Tsuiki (10) Patent No.: US 8,184,093 B2
(45) Date of Patent: May 22, 2012

(54) MOBILE TERMINAL DEVICE

(75) Inventor: Daisuke Tsuiki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 516 days.

(21) Appl. No.: 12/493,116

(22) Filed: Jun. 26, 2009

(65) Prior Publication Data

US 2009/0322793 A1     Dec. 31, 2009

(30) Foreign Application Priority Data

Jun. 27, 2008   (JP) ................................. 2008-168703

(51) Int. Cl.
  *G09G 5/00*  (2006.01)
(52) U.S. Cl. ........................................ 345/156; 345/157
(58) Field of Classification Search ........... 345/156–173
  See application file for complete search history.

(56) References Cited

U.S. PATENT DOCUMENTS

| | | | | |
|---|---|---|---|---|
| 7,071,916 B2 * | 7/2006 | Duarte et al. | ................. | 345/156 |
| 7,348,967 B2 * | 3/2008 | Zadesky et al. | ................ | 345/173 |
| 7,515,142 B2 * | 4/2009 | Park | ................. | 345/173 |
| 7,742,857 B2 * | 6/2010 | Iwamoto et al. | ................. | 701/36 |
| 7,907,118 B2 * | 3/2011 | Matsui et al. | ................. | 345/156 |
| 2006/0274053 A1 | 12/2006 | Kinouchi | | |
| 2007/0097093 A1 | 5/2007 | Ohshita et al. | | |
| 2009/0073114 A1 * | 3/2009 | Bay et al. | ................. | 345/156 |
| 2010/0033423 A1 * | 2/2010 | Iio | ................. | 345/156 |
| 2010/0214243 A1 * | 8/2010 | Birnbaum et al. | ............ | 345/173 |

FOREIGN PATENT DOCUMENTS

| | | |
|---|---|---|
| JP | 2003-260988 | 9/2003 |
| JP | 2003-348370 | 12/2003 |
| JP | 2004-318362 | 11/2004 |
| JP | 2006-323664 | 11/2006 |
| JP | 2007-122459 | 5/2007 |
| JP | 2008-046971 | 2/2008 |
| JP | 2008-052581 | 3/2008 |
| WO | WO-2008/023667 | 2/2008 |

OTHER PUBLICATIONS

Notification of Rejection (translation) for Japanese Patent Application No. 2008-168703, mailed Jun. 15, 2010, 7 pages.

* cited by examiner

*Primary Examiner* — Nitin Patel

(74) *Attorney, Agent, or Firm* — Morrison & Foerster LLP (57) ABSTRACT

A device and method for selecting one option from a plurality of options is disclosed. A sequential selection of one option from the plurality of options proceeds when a detecting unit detects an operation associated with movement. A selecting unit sequentially selects one option from a plurality of options, and then the detecting unit detects if the operation associated with movement is stopped and the operation associated with movement is stopped.

19 Claims, 7 Drawing Sheets

MOBILE TERMINAL DEVICE

CROSS-REFERENCE TO RELATED APPLICATION

The present application claims priority under 35 U.S.C. §119 to Japanese Patent Application No. 2008-168703, filed on Jun. 27, 2008, entitled "MOBILE DEVICE". The content of which is incorporated by reference herein in its entirety.

FIELD OF INVENTION

The present invention relates generally to information devices, and more particularly relates to selecting information on an information device.

BACKGROUND OF THE INVENTION

In conventional information devices, such as a mobile terminal such as a mobile telephone, means for accepting operation input from a user have an increasingly diversified range of functions. For example, a model in which a touch sensor is incorporated in addition to a keypad with a plurality of operation keys.

The use of the touch sensor may improve operability. For example, a touch sensor is provided in a numeric keypad unit of an existing mobile terminal for scrolling of a screen.

An operation associated with movement, in which a user touches the plurality of operation keys in a predetermined order, can be performed on the above mentioned mobile terminal. In order to sequentially select one option from a plurality of options, it is necessary to perform an operation associated with movement. A user may feel the repetitive operation to be bothersome. Therefore, there is a need to select one option from a plurality of options with less bother.

SUMMARY

A device and method for selecting one option from a plurality of options is disclosed. A sequential selection of one option from the plurality of options proceeds when a detecting unit detects an operation associated with movement. A selecting unit sequentially selects one option from a plurality of options, and then the detecting unit detects if the operation associated with movement is stopped and the operation associated with movement is stopped.

A first embodiment comprises an information device. The information device comprises detecting means operable to detect an operation associated with a movement, and selecting means operable to select one option from a plurality of options. The information device further comprises control means operable to cause a sequential selection of one option from the plurality of options in response to a detection of the operation associated with movement, a selection of one option from the plurality of options, and a detection of a sustained stopping of the operation associated with movement after the detection of the operation associated with movement.

A second embodiment comprises an information input device. The information input device comprises a display unit operable to display information, a touch sensor comprising at least one sensor element operable to detect a touching point by a user on the at least one sensor element. The information device further comprises a control unit operable to start a displaying of a scroll screen on the display unit, start scrolling of the scroll screen in response to a movement of the touching point followed by a stop at a stop point, and stop scrolling in response to a release of the touching point.

A third embodiment comprises a method of scrolling a display screen. The method comprises detecting a movement of a touching point on a touch sensor followed by detection of a stop of the touching point at a stop point, and detecting the touching point remaining at the stop point after the detection of the stop. The information device further comprises displaying a scroll screen on the display unit, scrolling the scroll screen while the touching point remains at the stop point, and stopping scrolling when the touching point is released.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

DETAILED DESCRIPTION OF EXEMPLARY EMBODIMENTS

The following detailed description is exemplary in nature and is not intended to limit the disclosure or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely, mobile phone display screen management. Embodiments of the invention, however, are not limited to such mobile phone applications, and the techniques described herein may also be utilized in other applications. Additionally, embodiments of the invention are not limited to the mobile phone applications, and other device such as, without limitation, a personal handy phone system, a laptop computer, a PDA, a game machine, and the like, may also be used.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims.

The information device shall mean a device that includes a display unit to be able to display various kinds of information on the display unit. The mobile terminal shall mean a portable device that can be connected to a wireless network.

Figure 1:
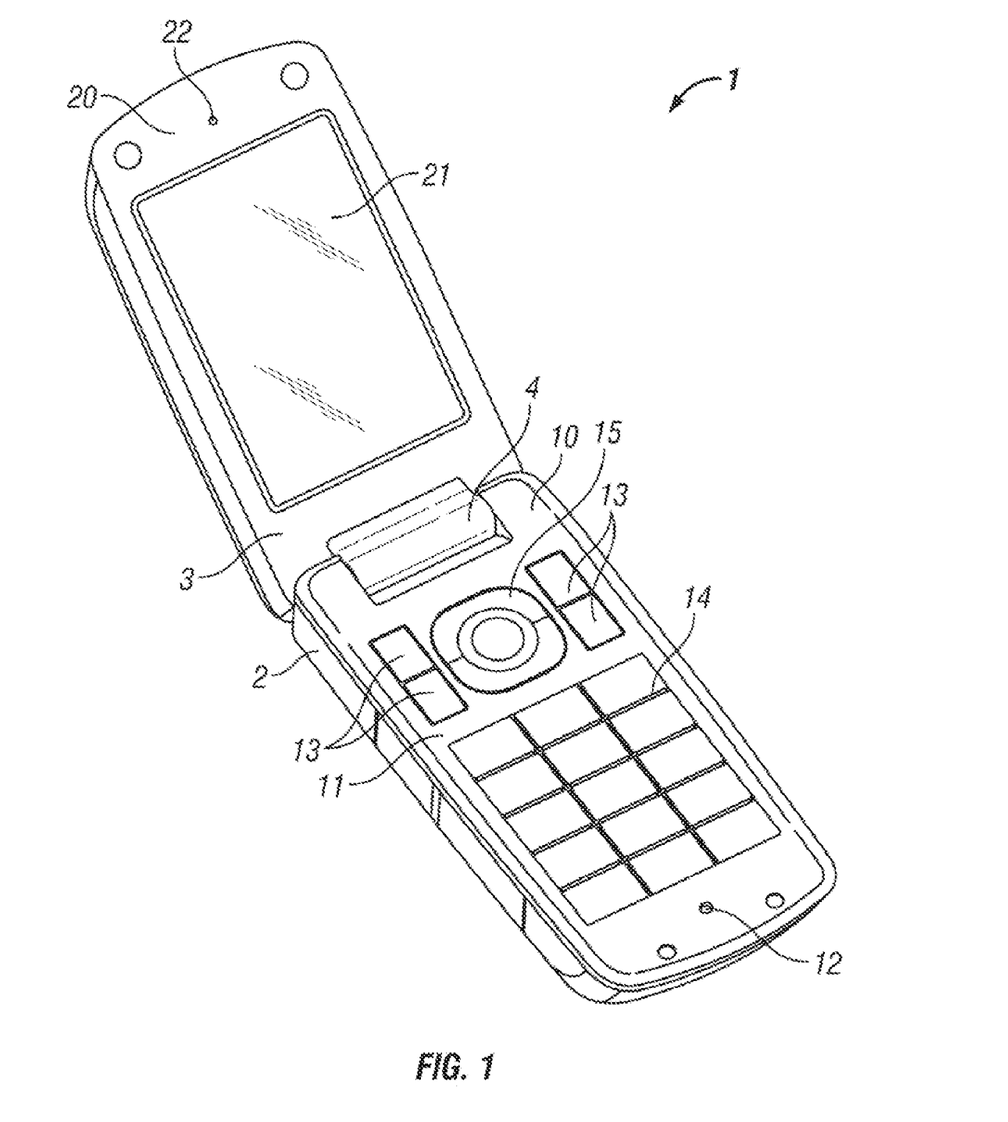
FIG. 1 illustrates an external perspective view of a mobile phone in an open position.

FIG. 1 is an illustration of an external perspective view of a mobile telephone phone 1 in an open position. As shown in FIG. 1, a mobile telephone 1 according to one embodiment may comprise a housing 2 and a second housing 3. The first housing 2 may comprise a key input unit 11 and a microphone 12 both of which are exposed at the front surface 10 thereof. The sound input unit 12 (microphone 12) receives sounds such as a voice of a user when the user talks on the mobile phone 1.

The key input unit 11 includes function-setting operation keys 13, input operation keys 14, and a decision operation key 15. The function-setting operation keys 13 are used to make various settings or to activate various functions such as an address directory function and a mail function. The input operation keys 14 include number keys for inputting, for example, phone numbers and characters for writing mails. The decision operation key 15 is used to confirm a decision in various operations or to scroll the display screen upward, downward, leftward, or rightward.

The second housing 3 may include a display unit 21 for displaying various kinds of information and a receiver 22 configured to externally output a sound upon receipt of an incoming e-mail message or call.

The hinge mechanism 4 is operable to connect the first housing 2 and the second housing 3 to allow their relative movement. The hinge mechanism 4 allows the mobile telephone 1 to switch between an in-use state (open position) and a stored state (folded state or closed position).

In the above-described embodiment, a folding-type cellular phone apparatus (mobile phone) is described. Alternatively, the cellular phone apparatus may be a slide type, a rotation type or a straight type of device. In the slide type, the first casing portion can slide with respect to the second casing portion to place the cellular phone in open and closed configures. In a rotation type, one of the first casing portion and the second casing portion can be rotated around an axis along a desired direction in which the first casing portion and the second casing portion may be rotated with respect to one another. In a straight type, the first casing portion and the second casing portion are disposed in a single casing.

Figure 2:
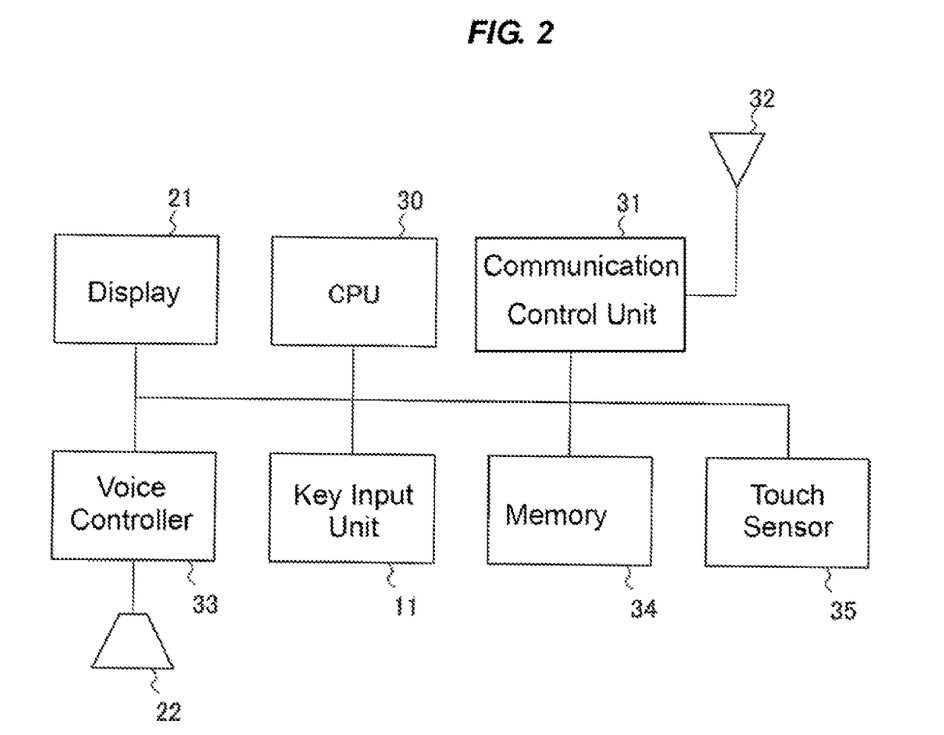
FIG. 2 illustrates an exemplary functional block diagram showing functions of the mobile phone according to an embodiment of the invention.

FIG. 2 is a functional block diagram illustrating functions of the mobile telephone 1 according to an embodiment of the invention. The mobile telephone 1 may comprise a display unit 21, a CPU 30, a communication control unit 31, an antenna 32, a voice controller 33, a receiver 22, a key input unit 11, a memory 34 and a touch sensor (or detector) 35.

The CPU 30 (control unit) controls the mobile telephone 1. For example, the CPU 30 performs predetermined control to the display unit 21, the communication control unit 31, and the voice controller 33. The CPU 30 accepts the input from the key input unit 11 and the touch sensor 35 to perform various kinds of processing. In performing the processing, the CPU 30 controls the memory 34 to read and write various programs and data.

The display unit 21 performs predetermined image processing under the control of the CPU 30. After the processing, the image data is stored in a frame memory, and the image data is sent to a screen at predetermined timing. The display unit 21 may comprise an image display device such as, without limitation, a light emitting diode (LED) display, a liquid crystal display (LCD), or an organic EL display (OLED). The display unit 21 may be used to display an image corresponding to images provided by the CPU 30.

The communication control unit 31 conducts communication with an external device at a predetermined usable frequency band (for example, 800 MHz). The communication control unit 31 performs demodulation processing to a signal received from the antenna 32, and then supplies the processed signal to the CPU 30. The communication control unit 31 performs modulation processing to a signal supplied from the CPU 30, and then transmits the signal to the external device from the antenna 32.

The voice controller 33 performs predetermined voice processing to a signal supplied from the communication control unit 31 under the control of the CPU 30, and then outputs the processed signal to the receiver 22. The receiver 22 externally outputs the signal supplied from the voice controller 33. A speaker (not illustrated) may output the signal instead of the receiver 22, or the speaker and the receiver 22 may supply the signal.

The voice controller 33 processes a signal fed from the microphone 12 (FIG. 1) under the control of the CPU 30, and then outputs the processed signal to the communication control unit 31. The communication control unit 31 performs predetermined processing to the signal supplied from the voice controller 33, and then outputs the processed signal from the antenna 32.

The memory 34 may include working memory, and is used in arithmetic processing performed by the CPU 30. The memory 34 is operable to store various kinds of data used for various processes of the mobile phone 1. In practical embodiments, the memory 34 may comprise, for example, a non-volatile memory or storage device (non-volatile semiconductor memory, hard disk device, optical disk device, and the like), a random access storage device (for example, SRAM, DRAM), or any other form of storage medium known in the art. For example, the memory 34 may store a computer program which is executed by the CPU 30. For another example, memory 34 may store input state of the user into the touch sensor 35 (moving speed and press-down pressure), tables (not illustrated) used to determine a scrolling speed and an amount of scrolling operation, an address book for managing personal information such as telephone numbers and e-mail addresses, an audio file for reproducing a ring tone and alarm tone, an image file for a standby screen, various kinds of setting data, a temporary data used in a program process, and the like. The memory 34 may be coupled to the CPU 30 such that the CPU 30 can read information from and write information to memory 34. As an example, the CPU 30 and memory 34 may reside in their respective ASICs. The memory 34 may also be integrated into the CPU 30. In an embodiment, the memory 34 may include a cache memory for storing temporary variables or other intermediate information during execution of instructions to be executed by the CPU 30. The memory 34 may use the non-volatile memory for storing instructions to be executed by the CPU 30. A detachable external memory may be used as the memory 34.

The touch sensor 35 is detects the touch of a finger of the user or a position touched by the user. The CPU 30 receives the sensing result of the touch sensor 35 to detect a transition of the sensing result as various operation inputs. An existing capacitance type or resistive film type sensor can be used as the touch sensor 35.

In the embodiment, the CPU 30 detects an operation in which the user moves the finger while touching the touch sensor 35 with the finger as the operation associated with movement, and then detects an operation in which the user stops the finger that is moving while the user touches the touch sensor 35 without releasing the finger from the touch sensor 35 as an operation not associated with movement. The operation not associated with movement is generated by maintaining the stop of the operation associated with movement.

Figure 3:
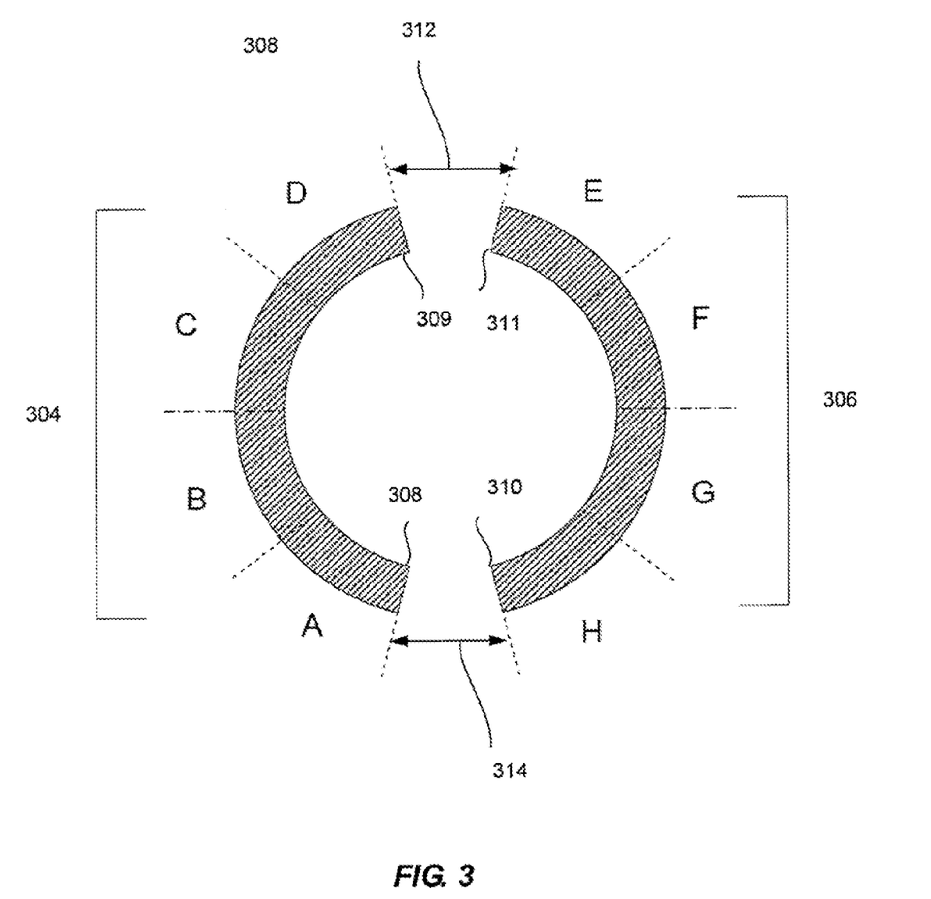
FIG. 3 illustrates an exemplary touch sensor according to an embodiment of the invention.

FIG. 3 illustrates a disposition example of the touch sensor 35 according to an embodiment of the invention. In this embodiment, the touch sensor 35 may include capacitance type sensor elements A to H that can detect contact/proximity of the finger of a human body. The eight sensor elements A to H formed into an arcuate shape are substantially circularly arranged in a circumference of one circle. The sensor elements A to H can detect touch and release, respectively. When the user touches a plurality of sensor units, the sensor unit receiving the strongest pressing force is detected. In another embodiment, the touch sensor 35 may include a pressure sensor operable to detect pressing force of the finger of a human body.

The touch sensor 35 can be provided, without limitation, in the key input unit 11, the microphone 12, the display unit 21, the receiver 22, and the periphery thereof. The touch sensor 35 may be provided on the side opposite the key input unit 11 of the first chassis 2 and on side opposite the display unit 21 of the second chassis 3. The touch sensor 35 may further be provided in the display unit.

The touch sensor 35 may include a first sensor module 304 comprising the four sensor elements A to D and a second sensor module 306 comprising four sensor elements E to H. The first sensor module 304 and the second sensor module 306 can be formed into an arcuate shape, and have a layout in which end portions 308/309 of the first sensor module 304 and end portions 310/311 of the second sensor module 306 can be brought close to each other so as to form a ring shape. A clearance (gap) is provided between the sensor elements near each other in each sensor module 304/306 such that the sensor elements near each other do not interfere with the contact detecting function. The clearance is eliminated when a sensor element that does not interfere with another sensor element is used. Cut lines 312/314 are provided between the first sensor module 304 and the second sensor module 306, that is, between the sensor unit D and the sensor unit E and between the sensor unit A and the sensor unit H. The cut line 312/314 is not limited to this embodiment, but the cut line 312/314 can comprise a clearance. The cut line 312/314 can reduce the interference of the finger with the first sensor element group and the second sensor element group when the first sensor element group and the second sensor element group are separately operated. The cut line can be neglected by control of a touch sensor driver that detects the signals from the sensor modules near to each other.

When the sensor units adjacent to each other are sequentially touched, the CPU 30 determines that the operation associated with movement is performed, and then the CPU 30 performs the scrolling processing (processing for sequentially selecting one option from a plurality of options). Then, the operation associated with movement is stopped, and the stop of the operation associated with movement is maintained to detect that the same sensor unit is continuously touched. At this point, the CPU 30 determines that the operation not associated with movement is performed, and then continues the already started scrolling processing. That is, the user continuously touches the sensor unit after sequentially touching (tracing) a plurality of sensor units, which allows the scrolling to be continued.

Figure 4:
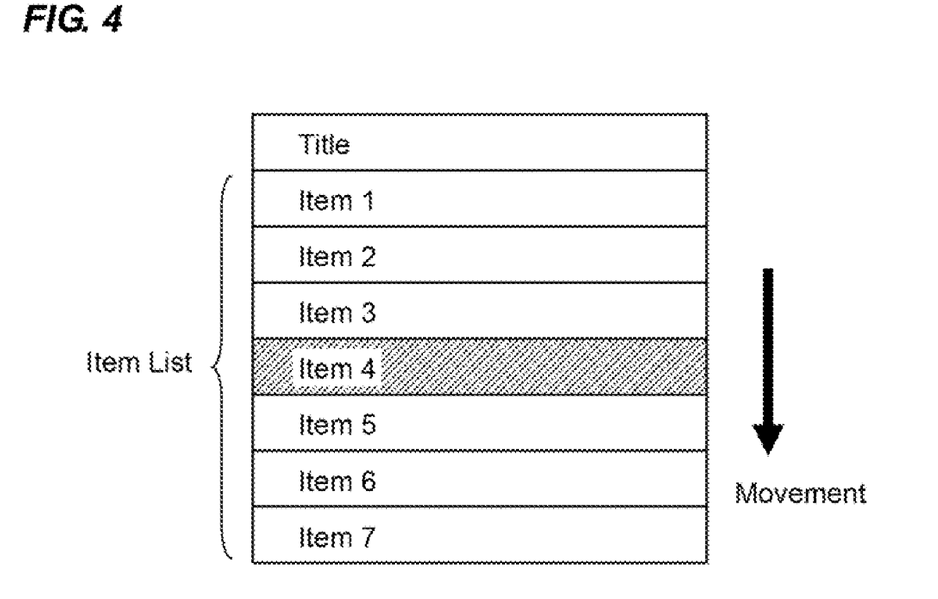
FIG. 4 illustrates an exemplary item list on a scrolling screen with item 4 selected during scroll.

FIG. 4 illustrates a positional change of an operation target domain of the display unit 21 according to the detected sensor element. For example, the operation target domain (a cursor and a highlighted display domain, which are illustrated on item 4 by hatching) where one of items 1 to 7 is selected on the display unit of FIG. 4 is scrolled downward when the user traces the ring-shaped sensor elements from the sensor unit A toward the sensor unit D with the finger, and such a "moving rule" that the scrolling is performed upward is previously defined when the user traces the ring-shaped sensor elements from the sensor unit H toward the sensor unit E with the finger.

The movement of the sensor unit A to the sensor unit B, the movement of the sensor unit B to the sensor unit C, and the movement of the sensor unit C to the sensor unit D are performed by the upward scrolling in which one option is sequentially selected in the ascending display order when the plurality of options (items 1-7 in FIG. 4) are sequentially displayed in the vertical direction. The movement of the sensor unit E to the sensor unit F, the movement of the sensor unit F to the sensor unit G, and the movement of the sensor unit G to the sensor unit H are performed by the downward scrolling in which one option is sequentially selected in the descending display order when the plurality of options are sequentially displayed in the vertical direction. The movement may be started from any position (A to H). The relationship between the moving direction and the scrolling direction is not limited to the embodiment. For example, a predetermined rule may be defined such that the clockwise movement is performed by the downward scrolling while the counterclockwise movement is performed by the upward scrolling.

The touch sensor 35 may be located, without limitation, on the decision operation key 15 in the key input unit 11 on the input operation button 14, on the display unit 21 or the periphery of the sub-display (not illustrated), and the like. The disposition mode of the touch sensor 35 is not limited to the circular shape, and the number of the sensor units is not limited to eight.

Figure 5:
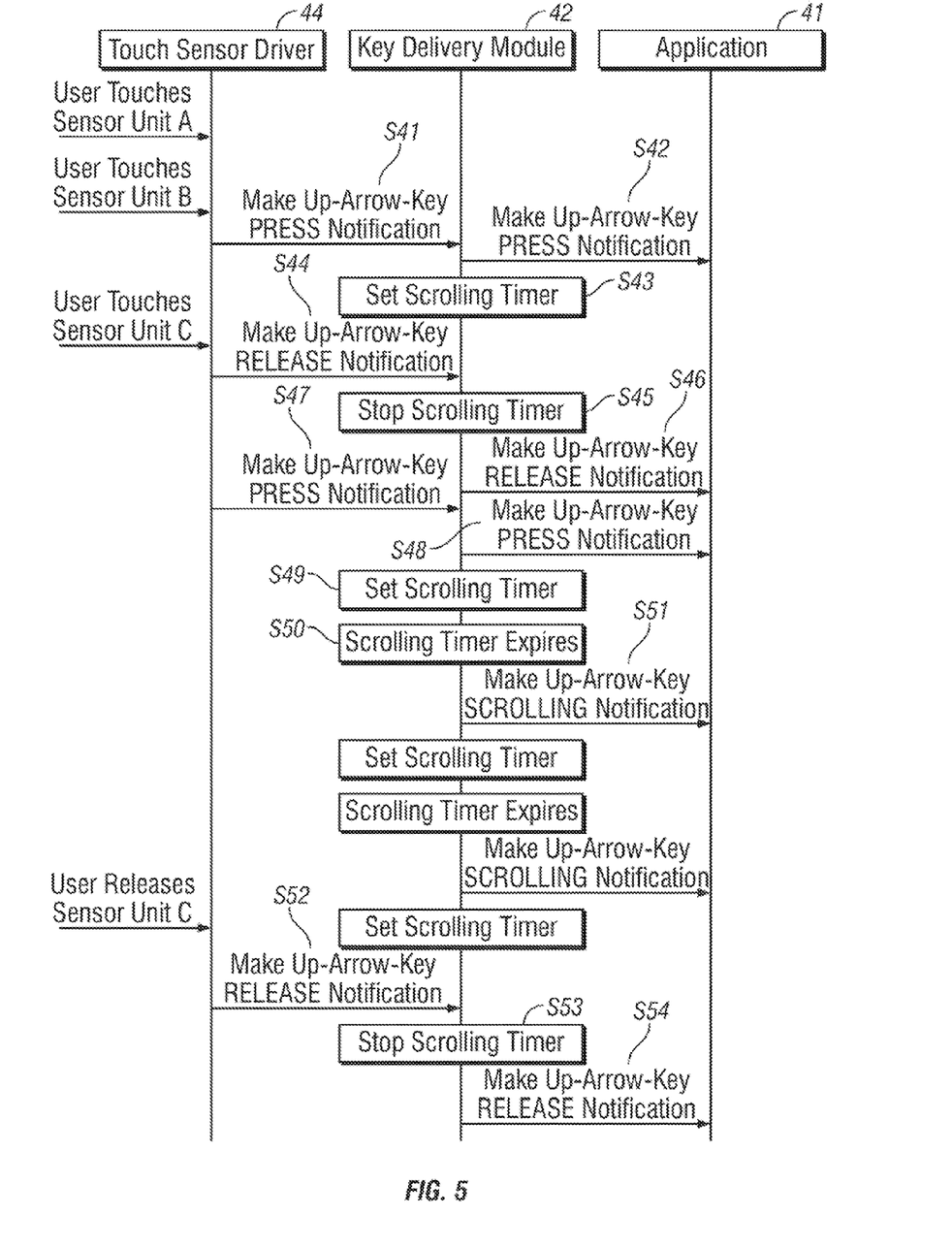
FIG. 5 illustrates an exemplary timing diagram showing a scroll process performed by a CPU based on input operation using a touch sensor according to an embodiment of the invention.

FIG. 5 is a flowchart showing the scrolling process 500 that is performed by the CPU 30 based on the input operation into the touch sensor 35 of the embodiment. The process 500 will be described in cases where the user touches the sensor unit A and moves the finger from the sensor unit B to the sensor unit C while continuously touching the touch sensor 35 of FIG. 3. The various tasks performed in connection with process 500 may be performed by software, hardware, firmware, or any combination thereof. For illustrative purposes, the following description of process 500 may refer to elements mentioned above in connection with FIGS. 1-4. In practical embodiments, portions of process 500 may be performed by different elements of the described mobile phone 2, e.g., the display 21, the CPU 30, the communication control unit 31, the antenna 32, the voice controller 33, the receiver 22, the key input unit 11, the memory 34 and the touch sensor (or detector) 35. Process 500 may include any number of additional or alternative tasks. The tasks shown in FIG. 5 need not be performed in the illustrated order, and process 500 may be incorporated into a more comprehensive procedures or processes comprising additional functionality not described in detail herein.

Application 41 is a program that controls each function in the mobile telephone 1. For example, an application for displaying a standby screen can be cited as an example of the application 41. The application 41 accepts a key delivery notification from the key delivery module 42, and processing is performed by executing the application 41 in response to the operation input of the user. The key delivery module 42 accepts the key detection notification from the key scan driver 43, and then makes the key delivery notification to the application that is currently executed.

The touch sensor driver 44 detects the touch or release of the sensor unit to notify the key delivery module 42 of the corresponding key event. Because the selection items are not moved when the user just touches one sensor unit, the touch sensor driver 44 does not notify the key delivery module 42 of the key event. The touch sensor driver 44 notifies the key delivery module 42 of the key press when the user moves the finger to another sensor unit while continuously touching one sensor unit. The touch sensor driver 44 notifies the key delivery module 42 of the key release when the user moves the finger to another sensor unit or releases the finger from the sensor unit while the key press event is already generated.

When the user touches the sensor unit B after touching the sensor unit A, the touch sensor driver 44 makes the up-arrow-key press notification to the application 41 through the key delivery module 42 (Tasks S41 and S42). Because the continuous touch from the sensor unit A to the sensor unit B indicates the upward scrolling as described above, the touch sensor driver 44 determines that the up arrow key is pressed down once.

In Task S41 of FIG. 5, because the contact detection is moved (swept) from the sensor unit A to the sensor unit B, the touch sensor driver 44 determines that the upward scrolling is performed, and then outputs the up arrow key press. The determination of the sweep direction will be described below.

For example, the touch sensor driver 44 turns on a touch flag when the sensor unit B detects the touch. The touch sensor driver 44 also retains information that the touch detection is generated in the sensor unit B.

When another sensor unit detects the touch while the flag is turned on, the touch sensor driver 44 determines that the touch position is moved (swept), and then determines the moving direction of the touch position.

Specifically, the touch sensor driver 44 determines whether the sensor unit that newly detects the touch is disposed above or below the sensor unit (in this case, the sensor unit B) that previously detects the touch. For example, the touch sensor driver 44 determines that the touch position is moved below the sensor unit B when the sensor unit A newly detects the touch, and the touch sensor driver 44 determines that the touch position is moved above the sensor unit B when the sensor unit C newly detects the touch.

At this point, the key delivery module 42 sets a scrolling processing timer (Task S43).

When the sensor unit C detects the touch after the touch position is moved from the sensor units A to the sensor unit B, the touch sensor driver 44 makes the up-arrow-key release notification corresponding to the touch position from the sensor unit A to the sensor unit B to the key delivery module 42 (Task S44). When receiving the release notification, the key delivery module 42 stops the scrolling processing timer (Task S45), and then makes the up-arrow-key release notification to the application 41 (Task S46).

Then the touch sensor driver 44 makes the up-arrow-key press notification to the application 41 through the key delivery module according to the movement of the touch position from the sensor unit B to the sensor unit C (Task S47 and Task S48).

At this point, the key delivery module 42 sets the scrolling processing scrolling processing timer again (Task S49). When the timer expires (Task S50), the key delivery module 42 determines that the operation associated with movement is stopped, and then notifies the application 41 of an instruction to perform the scrolling operation corresponding to the press of the up arrow key (Task S51). The scrolling state is continued by repetition from the timer setting to the scrolling performing instruction.

The touch sensor driver 44 makes the up-arrow-key release notification to the key delivery module 42 when the user releases the finger from the sensor unit C (Task S52). In response to the up-arrow-key release notification, the key delivery module 42 stops the scrolling processing timer (Task S53), and then makes the up-arrow-key release notification to the application 41 (Task S54). Therefore, application 41 stops the ongoing scrolling.

Figure 6:
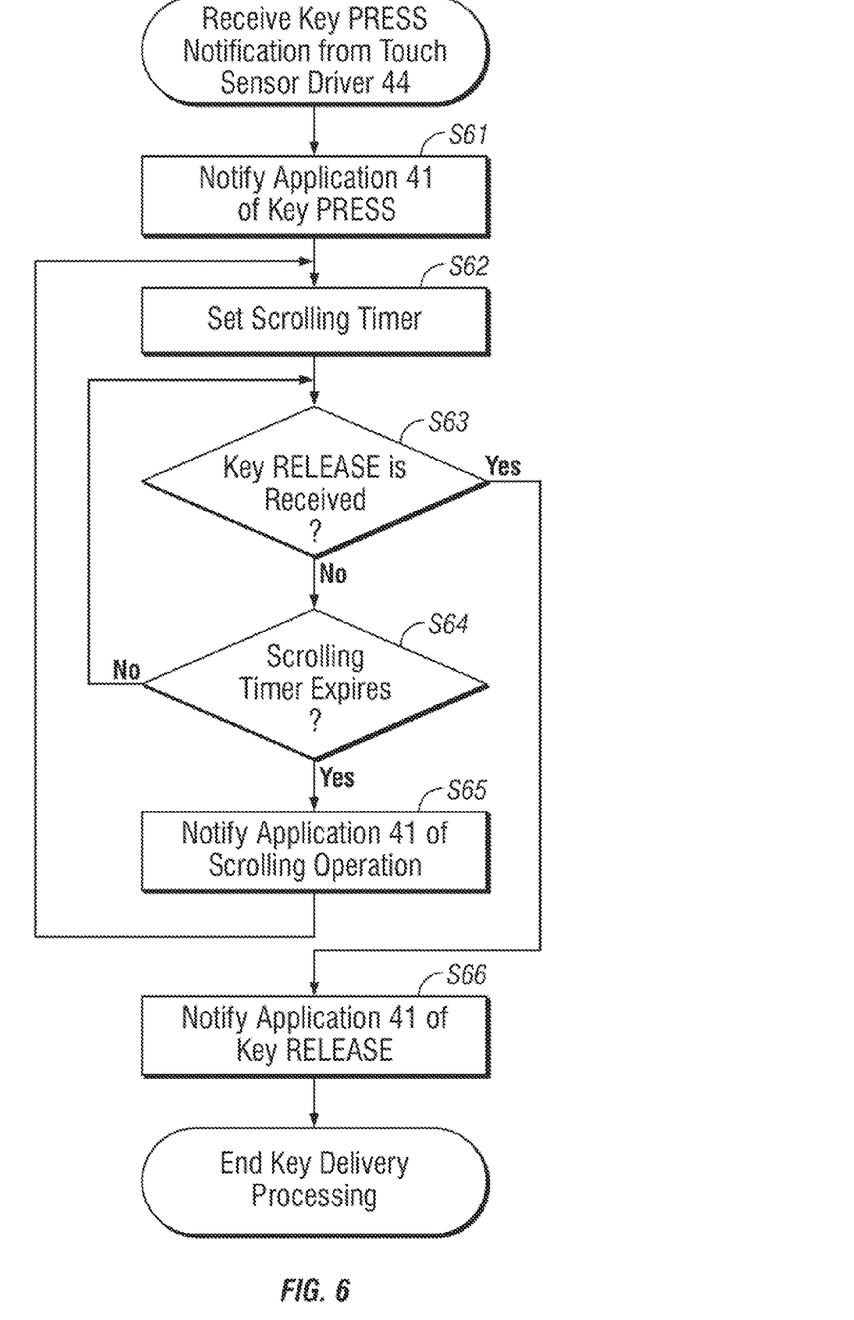
FIG. 6 is a flowchart illustrating an exemplary process performed by key receiving module based on a key input operation according to an embodiment of the invention.

FIG. 6 is a flowchart illustrating process 600 performed by the key delivery module 42 based on the operation fed into the touch sensor 35 according to an embodiment of the invention. FIG. 6 illustrates the processing after the key delivery module 42 receives the key press notification from the touch sensor driver 44. The various tasks performed in connection with process 600 may be performed by software, hardware, firmware, or any combination thereof. For illustrative purposes, the following description of process 600 may refer to elements mentioned above in connection with FIGS. 1-4. In practical embodiments, portions of process 600 may be performed by different elements of the described mobile phone 2, e.g., the display unit 21, the CPU 30, the communication control unit 31, the antenna 32, the voice controller 33, the receiver 22, the key input unit 11, the memory 34 and the touch sensor (or detector) 35. Process 600 may include any number of additional or alternative tasks. The tasks shown in FIG. 6 need not be performed in the illustrated order, and process 500 may be incorporated into a more comprehensive procedures or processes comprising additional functionality not described in detail herein.

In Task S61, the key delivery module 42 makes the press notification of one of the up, down, right, and left arrow keys corresponding to the operation associated with movement (for example, continuous touch operation from the sensor unit A to the sensor unit B), which is detected by the touch sensor 35, to the application 41.

In Task S62, the key delivery module 42 sets the scrolling processing timer to start measurement of a predetermined time.

In Task S63, the key delivery module 42 determines whether the release notification relating to the key of which the press notification is made in Task S61 is received. The flow goes to Task S66 when the release notification is received, and the flow goes to Task S64 when the release notification is not received.

In Task S64, the key delivery module 42 determines whether a predetermined time elapses since the scrolling processing timer set in Task S62 expires. The flow goes to Task S65 when the predetermined time elapses, and the flow returns to Task S63 when the predetermined time does not elapse.

In Task S65, the key delivery module 42 notifies the application 41 of the scrolling performing instruction. The process 600 returns to Task S62, and the key delivery module 42 sets the scrolling processing timer again.

In Task S66, the key delivery module 42 makes the key release notification to the application 41 in response to the key release notification received in Task S63.

As described above, in the embodiment, when the user traces the touch sensor 35 with the finger to perform the scrolling operation, the mobile telephone 1 detects the operation associated with movement (for example, the movement from the sensor unit A to the sensor unit B) and the operation not associated with movement (for example, the touch of the sensor unit B is continued after the movement from the sensor unit A to the sensor unit B) in the touch sensor 35, and the mobile telephone 1 correlates the detected operation associated with movement or operation not associated with movement with the event of the key input unit 11.

Therefore, the mobile telephone 1 enables the operation close to the scrolling continuing operation performed by the key input unit 11. Specifically, when the user traces the touch sensor with the finger to perform the scrolling, because the scrolling operation can be continued only by touching the touch sensor until the user releases the finger from the touch sensor, it is not necessary for the user to repeat the operation for tracing the touch sensor.

The CPU 30 may continue the scrolling state when the operation not associated with movement is detected for a predetermined time or more after the stop of the operation associated with movement is detected, that is, when the state in which the user continuously touches the touch sensor 35 is detected for the predetermined time or more after the user stops the movement of the touch position on the touch sensor 35.

Therefore, the user continuously touches the touch sensor 35 for the predetermined time or more with an intention to continue the scrolling operation, which allows the user to continue the scrolling operation. Accordingly, the user can prevent the unintended processing from being performed such that the user should stop the scrolling operation but the scrolling operation is continued because the user touches the touch sensor 35 for a short time.

The CPU 30 may continue the scrolling state when the operation not associated with movement is detected while the touch sensor 35 is pressed with the predetermined force or more after the stop of the operation associated with movement is detected, that is, when the user presses the touch sensor 35 with the predetermined force or more after stopping the movement of the touch position on the touch sensor 35.

Therefore, the user presses the touch sensor 35 with the predetermined force or more with an intention to continue the scrolling operation, which allows the user to continue the scrolling operation. Accordingly, the user can prevent the unintended processing from being performed such that the user should stop the scrolling operation but the scrolling operation is continued because the user continuously slightly touches the touch sensor 35.

In addition to the touch sensor 35, another sensor may be used to detect the pressing force. Alternatively, the pressing force may be detected by the contact area in the touch sensor 35. For example, when the user touches the touch sensor 35 with the finger, the contact area is spread by the strong touch, and the contact area is narrowed by the weak touch. Therefore, the CPU 30 determines that the predetermined pressing force or more is generated when the predetermined contact area or more is detected.

The CPU 30 sets the scrolling speed to a predetermined value when the operation not associated with movement is detected to continue the scrolling operation. At this point, the CPU 30 may set the scrolling speed faster than a scrolling speed of the operation associated with movement. The scrolling speed may be determined by referring to a predetermined table (not illustrated) according to contents of the operation not associated with movement, that is, according to the touch time or pressing force.

Because the continued scrolling operation is set to the predetermined speed, the user can predict the speed of the scrolling operation performed from now. Therefore, the user can prevent the unintended scrolling operation from being performed. The speed of the continued scrolling operation is set faster to intentionally perform the operation not associated with movement caused by the stop of the operation associated with movement, so that the user can quickly reach the desired option.

The CPU 30 determines the scrolling speed according to the touch time or pressing force to the touch sensor 35, so that the user can adjust the speed of the continued scrolling operation. Accordingly, the user can perform the scrolling operation at the intended speed to easily reach the desired option.

The CPU 30 may continue the scrolling operation when the operation not associated with movement is detected while the scrolling operation is performed at the predetermined speed or more according to the operation associated with movement, that is, when the user stops the movement of the touch position on the touch sensor 35 while the scrolling operation is performed at the predetermined speed or more.

Therefore, the mobile telephone 1 continues the scrolling operation even after the user stops the movement of the touch position on the touch sensor 35 when the scrolling operation is performed at a speed faster than the predetermined speed, and the mobile telephone 1 stops the scrolling operation after the user stops the movement of the touch position on the touch sensor 35 when the scrolling operation is performed at a speed slower than the predetermined speed. Accordingly, the mobile telephone 1 can determine the presence or absence of the scrolling operation according to the operation status of the user.

When the user performs the scrolling operation to quickly reach the option, the mobile telephone 1 continues the scrolling operation even after the user stops the movement of the touch position on the touch sensor 35. Therefore, the mobile telephone 1 can aid the user operation and the user can quickly reach the periphery of the desired option. On the other hand, when the user slowly performs the scrolling operation while confirming the options, the mobile telephone 1 stops the scrolling operation after the user stops the movement of the touch position on the touch sensor 35. Therefore, the user can be prevented from passing through the desired option.

The CPU 30 may control the speed of the scrolling operation continued after the user stops the movement of the touch position on the touch sensor 35 according to the moving speed or moving distance in the operation associated with movement, that is, according to the moving speed or moving distance of the user's finger on the touch sensor 35.

In the speed control, by referring to a predetermined table (not illustrated), the speed of the continued scrolling operation is set faster as the touch moving speed is increased or as the moving distance is lengthened.

The mobile telephone 1 determines that the user further needs the scrolling operation with increasing moving speed of the user's finger on the touch sensor 35 or with increasing moving distance, and then aids the user operation by the faster scrolling operation. Therefore, the user can sensuously perform the scrolling operation without feeling uncomfortable in the speed of the continued scrolling operation.

The CPU 30 may stop the continued scrolling operation with a predetermined amount, that is, the CPU 30 may stop the continued scrolling operation after a predetermined number of options are sequentially selected. At this point, the CPU 30 controls the amount of continued scrolling operation according to the moving speed or moving distance of the user's finger on the touch sensor 35.

In the scrolling amount control, by referring to a predetermined table (not illustrated), the amount of continued scrolling operation is increased (scrolling operation is performed for a long time) as the touch moving speed is increased or as the moving distance is lengthened.

The mobile telephone 1 determines that the user further needs the scrolling operation with increasing moving speed of the user's finger on the touch sensor 35 or with increasing moving distance, and then aids the user operation by continuing the scrolling operation for a long time. Therefore, the user can sensuously perform the scrolling operation without feeling uncomfortable in the amount of continued scrolling operation.

In the mobile telephone 1, the presence or absence of the scrolling operation, the scrolling speed, and the amount of scrolling operation are finely adjusted by the wide variations of control according to the operation input into the touch sensor 35, so that the user can perform the desired scrolling operation depending on the situations. Further, scrolling manner (scrolling speed or scrolling amount) is changed after the user stops the movement of the finger according to the touch manner on the touch sensor 35 (such as tracing speed or distance), so that the scrolling operation close to the user feeling can be realized.

The CPU 30 may inform the user that the scrolling operation is continued from now or that the scrolling operation is continued using informing means such as the display unit 21, the receiver 22, other display devices (such as LED), and a speaker (not illustrated). Therefore, the mobile telephone 1 can aid the user operation of the touch sensor 35.

Figure 7:
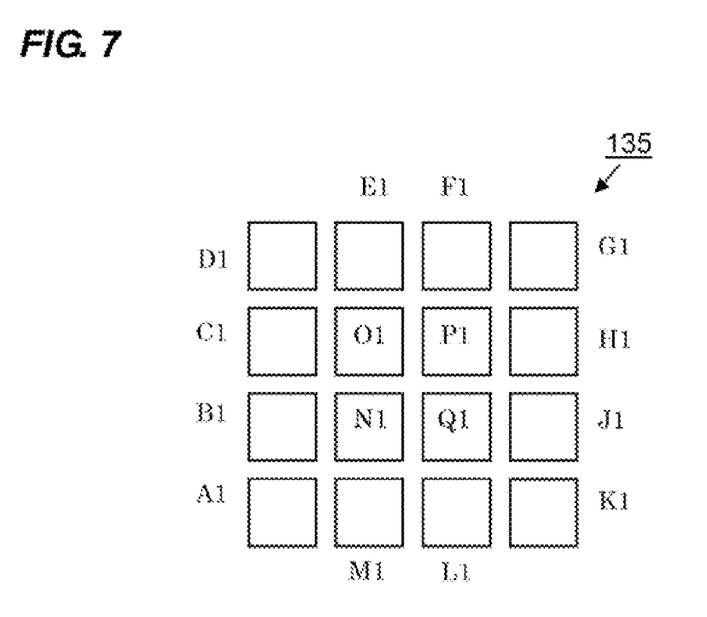
FIG. 7 illustrates an exemplary touch sensor according to an embodiment of the invention.

FIG. 7 illustrates an example of a touch sensor 135 according to an embodiment of the invention. In this embodiment, the touch sensor 135 includes 16 sensor elements A1 to Q1. The 16 sensor elements are arranged in a 4-by-4 matrix pattern. The sensor elements A1 to Q1 can detect touch and release, respectively.

The determinations of the touch moving direction and moving distance are made by a combination of the adjacent sensor elements and the sensor elements. Various techniques (determination rule) can be applied to the determinations of the touch moving direction and moving distance. For example, when the touch is transferred from one sensor element (for example, A1) to the adjacent sensor element (for example, M1 and L1), it is determined that the user moves the finger in that direction while continuously touching the touch sensor 135. At this point, the scrolling operation is started. When the user continuously touches one sensor element (for example, K1) after stopping the movement of the finger, the scrolling operation is maintained. The scrolling operation is stopped when the user releases the finger from the touched sensor element (for example, K1).

That is, it is necessary for the touch sensor driver or the key delivery module to determine whether the selection item currently displayed in the application is moved in the vertical direction or horizontal direction. A determination whether the relatively positional relationship between the newly detecting sensor unit and the previously detecting sensor unit is the vertical direction or the horizontal direction is made in determining the sweep direction with the touch sensor, and the application is notified of the determination result, which allows the selection movement to be performed according to the layout of the selection items.

Figure 8:
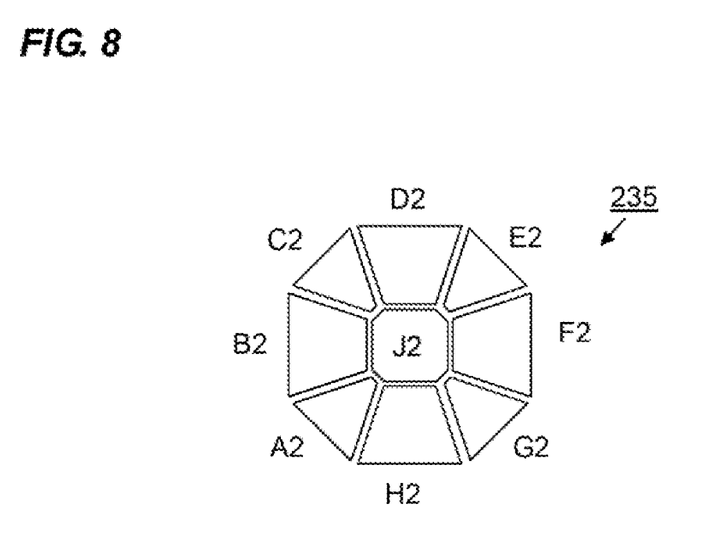
FIG. 8 illustrates an exemplary touch sensor according to an embodiment of the invention.

The sensor elements are not limited to the same shape. For example, as illustrated in FIG. 8, a touch sensor 235 according to an embodiment of the invention includes nine sensor elements A2 to J2. All the sensor elements A2 to J2 do not have the same size. The sensor elements A2, C2, E2, and G2 have the same shape, the sensor elements B2, D2, F2, and H2 have the same shape, and the sensor element J2 has the shape that is different from those of other sensor elements. The sensor element J2 is located in the central portion, and the eight sensor elements A2 to H2 are disposed so as to surround the sensor element J2.

Note that a switching device using sensors and a method of detecting a switch is described in details in Japanese Patent Application No. 2006-223381 relevant portions of which is incorporated by reference herein.

The information device that can continue the state in which one option is sequentially selected from a plurality of options while the conventional bothersome element is reduced can be provided.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "existing," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying Tables, it is to be noted that changes and modifications may be apparent to those skilled in the art. Such changes and modifications are to be understood as being included within the scope of the present invention as defined by the claims.

What is claimed is:

1. An information device, comprising:
    a detecting unit operable to detect an operation associated with a movement;
    a selecting unit operable to select one option from a plurality of options;
    a control unit operable to cause a sequential selection of the one option from the plurality of options in response to:
        a detection of the operation associated with the movement,
        a selection of the one option from the plurality of options, and
        a detection of a sustained stopping of the operation associated with the movement after the detection of the operation associated with the movement.

2. The information device according to claim 1, wherein the detecting unit comprises a touch sensor.

3. The information device according to claim 2, wherein the control unit is further operable to cause a stop of the sequential selection of the one option from the plurality of options in response to a release of the touch sensor.

4. The information device according to claim 1, wherein the sustained stopping comprises a stop of more than a predetermined period of time.

5. The information device according to claim 1, wherein the control unit is further operable to cause the sequential selection to proceed with a selection speed set to a predetermined speed when the detecting unit is pressed with a predetermined force or more.

6. The information device according to claim 1, wherein the sequential selection proceeds with a selection speed that is set to a predetermined speed.

7. The information device according to claim 6, wherein the predetermined speed is faster than a sequential selection speed prior to the detection of the sustained stopping.

8. The information device according to claim 6, wherein the predetermined speed is based on types of operations during the sequential selection.

9. The information device according to claim 6, wherein the predetermined speed is based on a speed of the operation associated with the movement.

10. The information device according to claim 6, wherein the predetermined speed is based on a moved distance of the operation associated with the movement.

11. The information device according to claim 1, further comprising a notification unit operable to notify that the sequential selection continues.

12. An information input device, comprising:
    a display unit operable to display information;
    a touch sensor comprising at least one sensor element, and operable to detect a touching point by a user on the at least one sensor element; and
    a control unit operable to:
        start displaying a scroll screen on the display unit;
        start scrolling the scroll screen in response to a movement of the touching point followed by a stop at a stop point; and
        stop scrolling in response to a release of the touching point.

13. The information input device according to claim 12, wherein the touch sensor is further operable to detect a touching state of each of the sensor elements.

14. The information input device according to claim 13, wherein a scroll speed of the scrolling the scroll screen is set based on a movement speed of the touching point.

15. A method of scrolling a display screen, comprising:
    detecting a movement of a touching point on a touch sensor followed by detection of a stop of the touching point at a stop point;
    detecting the touching point remaining at the stop point after the detection of the stop;
    displaying a scroll screen on a display unit;
    scrolling the scroll screen while the touching point remains at the stop point; and
    stopping scrolling when the touching point is released.

16. The method according to claim 15, further comprising detecting a direction of the movement of the touching point, wherein the scroll screen is scrolled toward the direction of the movement of the touching point.

17. The method according to claim 15, further comprising detecting a speed of the movement of the touching point to obtain a detected speed, wherein the scroll screen is scrolled based on the detected speed.

18. The method according to claim 15, wherein one item is selected from a plurality of items displayed on the display unit in response to stopping scrolling.

19. The method according to claim 15, wherein the display unit comprises a touch sensor.

* * * * *